Sept. 11, 1951 S. N. VAN VOORHIS 2,567,862

COMMUNICATION SYSTEM

Filed May 17, 1945 2 Sheets-Sheet 1

INVENTOR.
STANLEY N. VAN VOORHIS
BY
William D. Hall.
ATTORNEY

INVENTOR.
STANLEY N. VAN VOORHIS
BY William D. Hall,
ATTORNEY

Patented Sept. 11, 1951

2,567,862

UNITED STATES PATENT OFFICE 2,567,862

COMMUNICATION SYSTEM

Stanley N. Van Voorhis, Rochester, N. Y., assignor, by mesne assignments, to the United States of America as represented by the Secretary of War Application May 17, 1945, Serial No. 594,258

7 Claims. (Cl. 177—351)

This invention relates to communication systems and more particularly to systems involving transmission of a plurality of signals each conveying its own intelligence.

In accordance with the present practice, it is often desired to transmit intelligence from a moving object such as a ship or airplane to another ship or plane, or to a stationary position such as a ground station. Quite often in these instances, it is desired to transmit additional intelligence such as might be used for synchronization of devices located at the sending and receiving stations.

Several attempts have been made to find a solution to this problem. The use of different methods of modulation for the two signals was tried. For example, the regular signal might be transmitted by amplitude modulation and the synchronizing signal transmitted by frequency modulation. This solution involved considerable additional equipment and was found unsatisfactory for air-borne use. Another method which was tried but found unsatisfactory was that of transmitting certain identifiable and separable signals as synchronizing signals. However, atmospheric disturbances as well as man-made interference could and did adversely affect the synchronization.

An object of the present invention is, therefore, to provide a reliable data transmission system, and a more specific object is to provide a system in which the synchronizing signal is transmitted in the form of a position-modulated pip which is demodulated by a video tracking circuit to reproduce the original synchronizing signal.

Another object of the invention is to provide a system which will transform mechanical motion to electrical signals which are transmitted, demodulated, and reconverted to mechanical motion.

A further object of this invention is to provide a system for transmitting a plurality of voltages and demodulating the transmitted signal to reproduce the original voltages.

A still further object of this invention is to provide a position modulating and demodulating system.

For a better understanding of the invention, together with other and further objects thereof, reference is had to the following description taken in connection with the accompanying drawings, in which.

Figure 1:
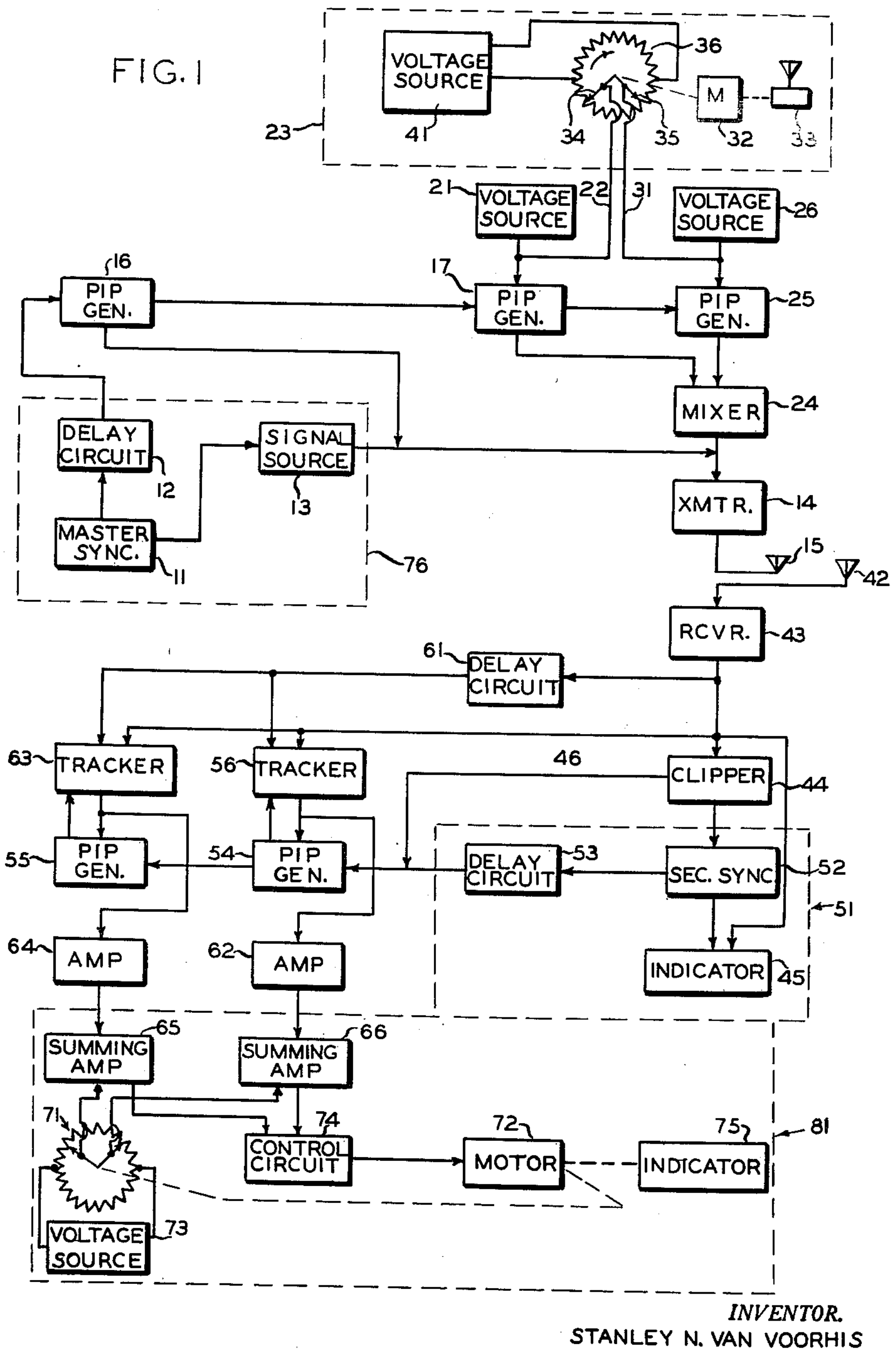
Fig. 1 is a block diagram of the invention.
Figures 3, 4:
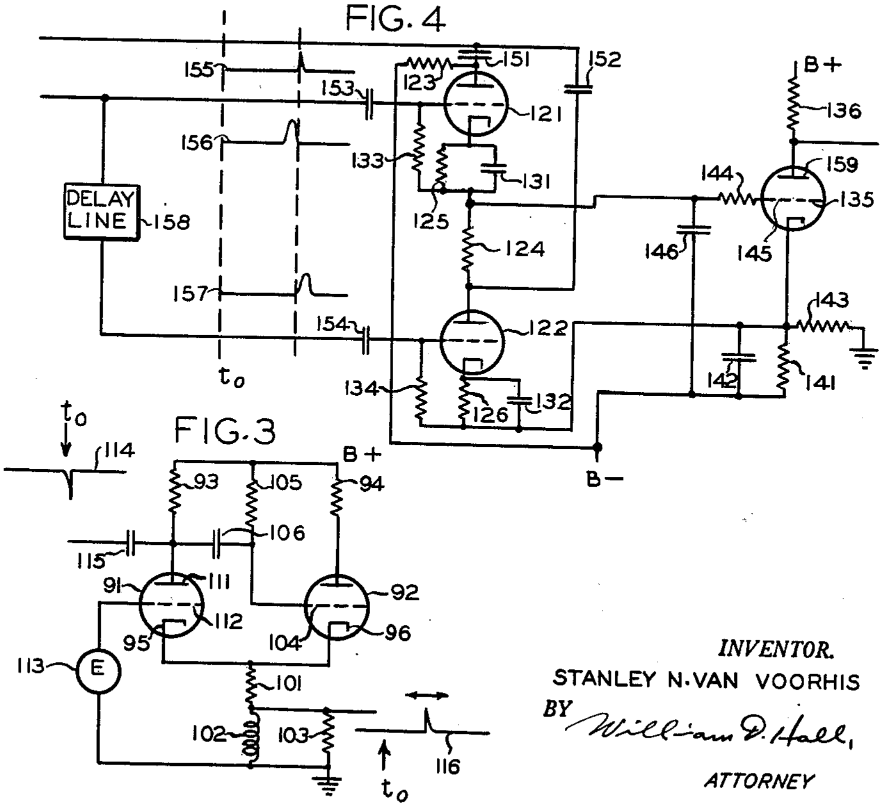
Fig. 3 is a typical pip-generating circuit or position-modulating circuit such as might be used in this invention.
Fig. 4 is a typical video-tracking circuit or position-demodulating circuit such as might be used in this invention.

Referring now particularly to Fig. 1 of the drawings, there is shown a block diagram of the invention. A master synchronizing oscillator circuit 11, which may be of a conventional design, drives a delay circuit 12, sucsh as a delay multivibrator, and a signal source 13. A typical delay multivibrator or pip-generating circuit is shown in Fig. 3 and will be described in greater detail hereinafter. Signal source 13 may comprise any conventional system modulated by intelligence which is to be transmitted. The signal source 13 drives a conventional transmitting circuit 14 which in turn feeds into an antenna 15 or other radiating device. The delay circuit 12 drives a pip-generating circuit 16. The circuit 16 in turn drives a pip generator 17 and also drives the transmitter 14. The pip which drives the transmitter 14 will normally be of greater amplitude than subsequent pips which are applied to the transmitter 14 from sources other than generator 16. A voltage source 21 or the voltage on lead 22 of voltage source 23 controls pip generator 17 whose output drives a mixer 24 and a pip generator 25. The mixer 24 is any conventional mixer, usually a vacuum tube circuit. A voltage source 26 or the voltage on lead 31 of voltage source 23 controls pip generator 25 whose output drives the mixer 24. The first of the series of pip-generating circuits, i. e., generator 11, is free-running, and may be of a conventional design. Each of the other generators 12, 16, 17 and 25, which also may be of a conventional design, controls the starting time or operating action of the generator or circuit following it. From the foregoing, it will be understood that a voltage source is provided for each of the generators or circuits 12, 13, 14, 16, 17, 24 and 25, to control the time of generation of the pip output or other output of that generator or circuit.

The output of pip generator 25 may be used to drive another pip generator which may drive another, and so on. There is no theoretical limit to the number of pip generators which may be so connected. It will be recognized that there is of course a practical limit.

The voltage source 23 comprises a motor 32 or other driving means which rotates an antenna 33 or other desired device. Contact arms 34 and 35 of a sine-wound potentiometer 36 are physically displaced 90° and are rotated by the motor 32. A sine-wound potentiometer is a potentiometer whose resistance varies as one complete cycle of a sinusoid when the resistance from a given point is plotted as a function of angular displacement from another given point. A unidirectional voltage source 41 connects to the potentiometer 36 at its minimum resistance points. Leads 22 and 31 connect the contact arms 34 and 35, respectively, to the pip generator 17 and pip generator 25.

An antenna 42 at the receiving station connects to a receiver 43. The receiver 43 drives a clipping circuit 44, or other pulse discriminating circuit, and a signal indicator 45. In general, the pulse discrimination is performed on the basis of pulse amplitude, and the clipping circuit 44 may be a biased diode or other circuit capable of passing only signals of an amplitude greater than a predetermined value. The signal indicator 45 may be a loudspeaker, earphones, cathode ray tube or other suitable indicating device. The lead 46 is not connected when the circuits within the dashed block 51 are used.

The clipper 44 drives a secondary synchronizer 52. Synchronizer 52 is similar to synchronizer 11, except that it is not free-running, but is controlled. The synchronizer 52 drives indicator 45 and a delay circuit 53 which is similar to delay circuit 12. The circuit 53 drives a pip generator 54, similar to generator 17, which in turn drives a pip generator 55 and similar to generator 25 and a video-tracking circuit 56. The video-tracking circuit 56 is fully described in the discussion relating to Fig. 4. The video-tracking circuit 56 is also driven by the receiver 43 directly and by the receiver 43 through a delay circuit 61. The delay circuit 61 is normally in the form of a delay line. A delay line may be defined as a transmission line or artificially simulated transmission line in which intelligence applied at one end does not appear instantly at the other end, but appears there only after a finite time delay.

The tracking circuit 56 drives conventional amplifiers or other desired circuits 62. The generator 55 drives another tracking circuit 63 which is similar to the tracking circuit 56, also driven by the receiver 43. The tracking circuit 63 drives conventional amplifiers or other desired circuits 64. The circuits 62 and 64 drive conventional summing amplifiers 66 and 65, respectively, as indicated. A summing amplifier is one which gives an output that is a function of the difference in amplitude of the two signals applied thereto. A sine-wound potentiometer 71 driven by a motor 72 and energized by voltage source 73, also drives amplifiers 65 and 66. The amplifiers 65 and 66 drive a conventional circuit 74 which controls the speed and direction of rotation of the motor 72. The motor 72 drives a rotating indicator 75. Indicator 75 may comprise a servo apparatus, the coils of a magnetic deflection cathode ray tube, or other desired device.

Figure 2:
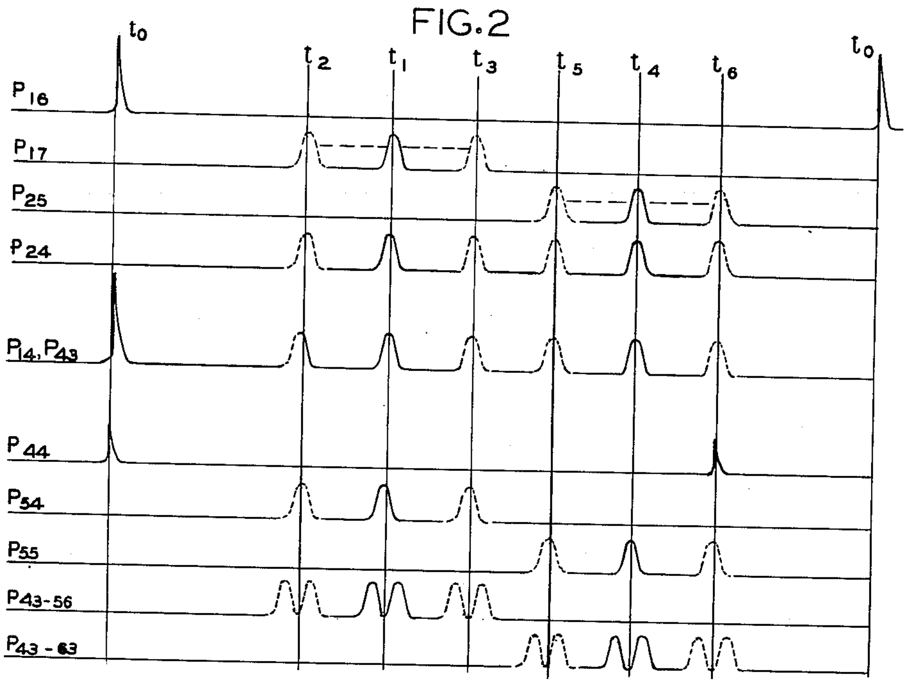
Fig. 2 shows several waveforms produced by components of the circuit represented in Fig. 1.

Referring now to the operation of the system, it will be first described in its more general embodiment. The waveforms of Fig. 2 will be constantly referred to for simplicity of explanation in this discussion. In Fig. 2, the capital letter P denotes pip, and the subscript denotes the circuit from which the waveform is taken. In the general embodiment, all circuits within, and all leads emanating from, or going into the dashed blocks 23, 51, 76, and 81, Fig. 1, are unused. The lead 46 connecting clipper 44 to generator 54, will be used. In the general embodiment, the pip generator 16 becomes a master reference source of pips.

A pip is herein taken to be a voltage pulse whose amplitude may vary from 5 to 50 volts or more, and whose duration may vary from 1 to 50 microseconds. The pips from the source 16 are regularly spaced and may occur at from 500 to 5000 per second. The numerical values here given are not to be taken as limitations of the invention. The time at which the pip is initiated by source 16 will be called to $t_0$. The pip output of source 16 is shown in Fig. 2, and denoted by $P_{16}$. This pip goes to the transmitter 14 where it will be transmitted. This pip or another one formed simultaneously therewith actuates pip generator 17, which produces a pip $P_{17}$ after a time interval determined by the control voltage from the source 21. The occurrence or "position" of this pip will vary about a time $t_1$ between such limits as $t_2$ and $t_3$. No variation occurs during one cycle, i. e., between reference pips from source 16, but variation in the position of the pip $P_{17}$ occurs over a period of time including several reference pips $P_{16}$. This positional variation is illustrated by $P_{17}$ (Fig. 2). It is thus seen that $P_{17}$, Fig. 2, is position-modulated by the voltage from source 21.

The pip from generator 17 goes to the mixer 24 and also actuates generator 25. The generator 25 in turn produces a pip $P_{25}$, Fig. 2, whose position in time varies about time $t_4$ between limits such as $t_5$ and $t_6$. The control voltage from source 26 controls the position of $P_{25}$. The output of generator 25 is fed to the mixer 24. Any number of voltage sources and generators may be added to this series in a manner similar to the connections shown herein. The outputs of the generators 17 and 25, and others which might be added, are combined in mixer 24. The resulting output is shown in Fig. 2, as $P_{24}$. This output $P_{24}$, combined with the output $P_{16}$, drives the transmitter 14 to produce an output $P_{14}$, Fig. 2, which is fed to the antenna 15.

The transmitted energy is received by antenna 42 and sent through the receiver 43. The receiver output $P_{43}$, Fig. 2, is identical to $P_{14}$, Fig. 2. The output $P_{43}$ divides, and a portion of it passes through the clipping circuit 44. Only the pip representing $t_0$ appears in the output $P_{44}$, Fig. 2. The output $P_{44}$ actuates generator 54 which produces an output pip $P_{54}$, Fig. 2, which in turn drives tracker 56 and actuates generator 55 to produce output $P_{55}$. The output $P_{43}$ of the receiver 43 travels through two paths to the tracking circuits 56 and 63. One of the two paths contains the delay line 61. The resulting input to tracker 56 is shown as $P_{43-56}$ in Fig. 2. These two pips, one of which was delayed, together with the pip from generator 54, produces an output from tracker 56 having a waveform the same as the voltage which produced the modulation of the pips from receiver 43. This output voltage is used to control the pip from the generator 54 and also is fed to the amplifier 62. The voltage output of amplifier 62 will be the same as the voltage which was applied to generator 17 from source 21. A pip from generator 55 and pips from receiver 43 drive tracker 63 to reproduce the modulation of the pips from the receiver 43 in the same manner as was described above for generator 54 and tracker 56. The voltage output from amplifier 64 will be identical to the voltage applied to generator 25 from source 26.

A specific use to which this invention may be applied will be described with reference to Fig. 1, utilizing the complete system as shown. It is often desired to transmit certain signals for a portion of a cycle, e. g., 750 out of each 1000 microseconds. It is, also, desired to transmit voltages which will synchronize a rotating antenna such as 33 and a rotating indicator 75. The master synchronizer 11 effects operation of the signal source 13 for a period of time, say 750 microseconds, and actuates the delay circuit 12. The circuit 12 delays the actuating pip to the generator 16 by a like amount (750 microseconds). After the elapse of the required time (750 microseconds), the generator 16 starts the same sequence which was described above in detail.

The control-voltage sources 21 and 26 may be considered as replaced by voltages on leads 22 and 31 from source 23. The motor 32 which drives the antenna 33 also drives the sine-wound potentiometer 36. A unidirectional voltage from source 41 is applied across the potentiometer 36, as shown. The two arms 34 and 35 will pick off voltages from the potentiometer 36 which vary sinusoidally and cosinusoidally with respect to the ground terminal of source 41, assuming the direction of rotation to be as indicated. These sine and cosine voltages are then respectively applied to control the pip generators 17 and 25.

In the receiving system similar actions occur. The output of clipper circuit 44 drives a synchronizing circuit 52 which turns on the indicator 45 for a period of time (750 microseconds). During this period of time the signals originating in signal source 13 will appear at the indicator 45. Simultaneously, the synchronizer 52 also actuates delay circuit 53 which delays the action of the generators 54 and 55 by the proper amount (750 microseconds). The outputs from the tracker circuits 56 and 63 will be sine and cosine voltages, respectively. These voltages are sent through amplifiers 62 and 64 and to summing amplifiers 66 and 65, respectively. The summing amplifiers 66 and 65 are also fed by sine and cosine voltages, respectively, from a sine-wound potentiometer 71 which is energized by a unidirectional voltage source 73, and is similar to potentiometer 36. The summing amplifiers 65 and 66 have outputs indicative of the difference in amplitude of the two voltages being applied to each. The outputs of amplifiers 65 and 66 are fed to amplifier 74 which controls the speed and direction of rotation of motor 72 in such a manner as to maintain the output of the amplifiers 65 and 66 unchanged. The motor drives the rotary indicator 75 as shown. It will be seen that the indicator 75 will follow in exact synchronism the movements of the antenna 33.

Referring now more particularly to Fig. 3, there is shown a type of conventional pip generator or delay circuit which may be used in this invention. It comprises triodes 91 and 92 or other suitable tubes with plate load resistors 93 and 94. The resistance 94 is smaller than the resistance 93. The cathodes 95 and 96 have a common load resistor 101. In series with resistor 101 is an inductance 102 and a resistance 103. A grid 104 of tube 92 is returned to B+ through resistor 105 and is connected by a capacitor 106 to plate 111 of tube 91. A grid 112 of tube 91 is returned to ground through a source of potential 113 which may be constant or variable depending upon the use which is being made of the circuit. B+ and ground constitute the plus and minus terminals, respectively, of a power source, not shown. Waveform 114 indicates the actuating pip which is coupled into the circuit by capacitor 115, and wave form 116 indicates the output pip.

Considering now the operation of the circuit, it will be noted that the grid 104 of tube 92 is returned to B+ and, therefore, tube 92 wil be normally conducting. The cathodes 95 and 96 will be at some potential above ground. The maximum value of voltage applied by the source 113 is such that the tube 91 will remain normally cut off. The pip (wave form 114) is coupled through capacitors 115 and 106 to the grid 104 of the tube 92. This pip will cause tube 92 to be cut off. Tube 91 conducts less heavily than tube 92 because of the larger resistor 93 and the effect of the voltage 113, and as a result, the cathodes 95 and 96 will be at a lower potential than normally with respect to ground. Other things being constant, the value of this cathode voltage above ground is determined by the voltage source 113. After tube 92 is cut off, the charge on condenser 106 changes and the grid 104 will start rising in potential toward B+. The time required before tube 92 again conducts will depend, other things being constant, upon the cathode voltage. The pip shown in waveform 116 will be formed by inductance 102 and resistance 103 when tube 92 again conducts. The time delay of this output pip after occurrence of the exciting pip will depend upon the voltage 113. The voltage 113 thus serves to modulate the position in time of the output pip 116. If voltage 113 is constant, the pip 116 will represent a constant delay.

Referring now more particularly to Fig. 4, there is shown a type of conventional video tracking circuit which may be used in this invention. The circuit illustrated in Fig. 4 is disclosed and claimed in the copending application of Edward F. MacNichol, Jr. Serial No. 534,310, filed May 5, 1944. It comprises triodes 121 and 122 or other suitable tubes with plate load resistors 123 and 124. The tubes 121 and 122 are provided with cathode biasing resistors 125 and 126, cathode biasing capacitors 131 and 132, and grid resistors 133 and 134. Resistors 124, 125 and 133, and capacitor 131 are connected together as shown. Resistor 123 connects to B—, a terminal negative with respect to ground. A third tube 135 has a plate load resistor 136, which connects to the positive terminal B+, and a cathode biasing resistor 141 and biasing capacitor 142. A resistor 143 together with the resistor 141 forms a voltage divider network between B— and ground. The terminals designated as B—, ground and B+ constitute three terminals of a power source not shown. Resistor 126 and capacitor 132 of tube 122 are connected to the resistors 141 and 143 as shown. The point between resistors 125 and 124 is conected by a resistance 144 to the grid 145 of tube 135, and by a capacitor 146 to B—. Voltage pips are applied through coupling capacitors 151, 152, 153 and 154 to the circuit.

In the operation of this circuit, three pips are required. These pips and their relative times of occurrence are illustrated diagrammatically by waveforms 155, 156 and 157. Pip 157 is identical to pip 156 except that it has been delayed by a delay line 158. Pips 156 and 157 are the pips which have been received by the receiver and which will have been modulated in position at the sending stations by a device such as shown in Fig. 3. The pip 155 is generated by a device at the receiving end such as shown in Fig. 3. It is desired that pip 155 be caused to remain fixed relative to pips 156 and 157. If this is done, then the voltage from source 113 (Fig. 3) which causes pip 155 to be stationary with respect to pips 156 and 157 will be the same as the original modulating voltage at the sending station. It will be obvious to those skilled in the art that if the time relationship of the pips is as shown in Fig. 4, both tubes 121 and 122 will conduct equally, and the charge on the capacitor 146 will remain unchanged. Therefore, the voltage at the plate 159 of tube 135 will remain unchanged.

To show the operations of this circuit, assume the pips 156 and 157 advance in time. It can then be seen that the tube 122 will conduct more than the tube 121. In this case the capacitor 146 loses charge, and the grid 145 drops in potential, while the voltage at plate 159 rises. If the voltage at plate 159 is fed back at the voltage from source 113 (Fig. 3) the pipe 155 will be made to occur sooner and thus again occur at a time which is between the two pips 156 and 157. It can also be shown that the reverse action will occur if pips 156 and 157 occur later in time. Therefore, it is seen that the voltage at plate 159 follows the voltage which caused position modulation at the sending end.

From all the foregoing, it will be seen that my improved communication system is particularly adaptable to meet the specific requirement, wherein certain signals, such as "intelligence," are to be transmitted for a portion of a cycle, e. g., 750 out of each 1000 microseconds, and synchronizing voltages are to be transmitted during the remaining portion of the cycle. The synchronizing voltages are effective to synchronize a rotating antenna such as 33, and a rotating indicator 75. At the receiving station, the intelligence signals are heard over a loudspeaker, or in earphones, or are observed on the screen of a cathode ray tube, depending upon what type of equipment or device is used for the indicator 45.

While there has been described what is at present considered the preferred embodiment of the invention, it will be obvious to those skilled in the art that various changes and modifications may be made therein without departing from the invention. For example, this apparatus will work equally well if all pip generators are activated by the master synchronizer rather than by the preceding pip generator as described hereinbefore. Corresponding changes would be made in the receiving device wherein the pip generator would be activated by the secondary synchronizer. Other changes may be made as dictated by circumstances, within the purview of the invention.

What is claimed is:

1. A communication system comprising a transmitting means; first synchronizing means; signal means associated with said first synchronizing means in such a manner as to be made alternately operative and inoperative thereby, said signal means being adapted to modulate said transmitting means; first delay means having a distinguishable first pip output, said first delay means being adapted to be actuated by said first synchronizing means, said first delay means being further adapted to modulate said transmitting means; first driving means; first unidirectional voltage means; first potentiometer means energized by said first voltage means; first and second contact means moved on said first potentiometer means by said first driving means, said first and second contact means being respectively disposed to produce sine and cosine voltage variations; first generating means having a second pip output, said first generating means being adapted to be actuated by said first pip output of said first delay means, said first generating means being further responsive to the voltage on one of said first and second contact means to control the time of generation of said second pip output; second generating means having a third pip output, said second generating means being adapted to be actuated by said second pip output of said first generating means, said second generating means being further responsive to the voltage on the remaining of said first and second contact means to control the time of generation of said third pip output; mixing means associated with said second and third pip outputs and said transmitting means in such a manner as to cause said transmitting means to be modulated by said second and third pip outputs; receiving means; second delay means; pip-discriminating means associated with said receiving means and said second delay means to control starting time of said second delay means; indicator means controlled by said receiving means and said second delay means to reproduce the output of said signal means; third generating means having a fourth pip output, said third generating means being actuated by said second delay means; third delay means; first tracking means associated with said receiving means, said third delay means and said third generating means in such a manner as to track said second pip output of said first generating means; first amplifier means responsive to said first tracking means to provide a voltage output identical with the voltage on the one of said first and second contact means associated with said first generating means, fourth generating means having a fifth pip output, said fourth generating means being adapted to be actuated by said fourth pip output; second tracking means associated with said receiving means, said third delay means and said fourth generating means in such a manner as to track said third pip output of said second generating means; second amplifier means responsive to said second tracking means to provide a voltage output identical with the voltage on the one of said first and second contact means associated with said second generating means; second driving means; second unidirectional voltage means; second potentiometer means energized by said second voltage means; third and fourth contact means moved on said second potentiometer means by said second driving means, said third and fourth contact means being respectively disposed to produce sine and cosine voltage variations; third amplifier means controlled by said first amplifier means and the voltage on one of said third and fourth contact means to produce an output proportional to the difference in magnitude of the voltages from said first amplifier means and said one contact means; fourth amplifier means associated with said second amplifier means and the remaining of said third and fourth contact means to produce an output proportional to the difference in magnitude of the voltages from said second amplifier means and said remaining contact means; and fifth amplifier means controlled by said third and fourth amplifier means to correlate the operation of said second driving means with the operation of said first driving means.

2. A communication system comprising a transmitting means; first synchronizing means; signal means associated with said first synchronizing means in such a manner as to be made alternately operative and inoperative thereby, said signal means being adapted to modulate said transmitting means; first delay means having a distinguishable first pip output, said first delay means being adapted to be actuated by said first synchronizing means, said first delay mean being further adapted to modulate said transmitting means; first generating means having a second pip output, said first generating means being adapted to be actuated by said first pip output of said first delay means; first voltage means associated with said first generating means for controlling the time of generation of said second pip output; second generating means having a third pip output, said second generating means being adapted to be actuated by said second pip output of said first generating means; second voltage means associated with said second generating means for controlling the time of generation of said third pip output; mixing means associated with said second and third pip outputs and said transmitting means in such a manner as to cause said transmitting means to be modulated by said second and third pip outputs; receiving means; second delay means; pip discriminating means associated with said receiving means and said second delay means to control starting time of said second delay means; indicator means controlled by said receiving means and said second delay means to reproduce the output of said signal means; third generating means having a fourth pip output, said third generating means being actuated by said second delay means; third delay means; first tracking means associated with said receiving means, said third delay means and said third generating means in such a manner as to track said second pip output of said first generating means; first amplifier means responsive to said tracking means to provide a voltage output identical with the voltage of said first voltage means; fourth generating means having a fifth pip output, said fourth generating means being adapted to be actuated by said fourth pip output; second tracking means associated with said receiving means, said third delay means and said fourth generating means in such a manner as to track said third pip output of said second generating means; and second amplifier means responsive to said second tracking means to provide a voltage output identical with the voltage of said second voltage means.

3. A communication system comprising a transmitting means; first generating means having a pip output, said first generating means being associated with said transmitting means in such a manner as to modulate said transmitting means; synchronizing means for controlling the starting time of said first generating means, said synchronizing means being adapted to modulate said transmitter with a distinguishable pip; variable voltage means associated with said first generating means to provide a time delay proportional to the instantaneous value of the voltage of said variable voltage means between the time of generation of said pip output and said starting time; receiving means; second generating means having a pip output; pip discriminating means associated with said receiving means and said second generating means to control the starting time of said second generating means; delay means; video tracking means associated with said receiver, said delay means and said second generating means in such a manner as to track said pip output of said first generating means; and amplifier means responsive to said tracking means to provide a voltage output identical with the voltage of said variable voltage means.

4. A communication system comprising a transmitting means; a first plurality of generating means having pip outputs, said first plurality of generating means being associated with said transmitting means in such a manner as to modulate said transmitting means; synchronizing means for controlling the starting time of said plurality of generating means, said synchronizing means being adapted to modulate said transmitter with a distinguishable pip; a plurality of variable voltage means associated with said first plurality of generating means to provide time delays in each of said plurality of generating means respectively proportional to the instantaneous value of each of the voltages of said plurality of variable voltage means between the respective times of generation of said pip outputs and the starting time of each of said plurality of generating means; receiving means; a second plurality of generating means having pip outputs; pip discriminating means associated with said receiving means and said second plurality of generating means to control the respective starting times of said second plurality of generating means; delay means; a plurality of video tracking means associated with said receiver, said delay means and said second plurality of generating means in such a manner as to track said pip outputs of said first plurality of generating means; and a plurality of amplifier means associated with said plurality of tracking means to provide voltage outputs respectively identical with the voltages of said plurality of variable voltage means.

5. A communication system comprising a transmitting means; first generating means having a pip output, said first generating means being associated with said transmitting means in such a manner as to modulate said transmitting means; synchronizing means for controlling the starting time of said first generating means; variable voltage means associated with said first generating means to provide a time delay proportional to the instantaneous value of the voltage of said variable voltage means between the time of generation of said pip output and said starting time; receiving means; second generating means having a pip output; delay means; and video tracking means associated with said receiver, said delay means and said second generating means in such a manner as to track said pip output of said first generating means.

6. A communication system comprising a source of a series of reference pulses; a first plurality of sources of variable voltages; means responsive to said plurality of variable voltages for deriving a like plurality of series of pulses from said series of reference pulses, wherein a first of said plurality of series of derived pulses is position modulated relative to said series of reference pulses in accordance with a first of said plurality of variable voltages, a second of said plurality of series of derived pulses is position modulated relative to said first series of derived pulses in accordance with a second of said plurality of variable voltages, and in a like manner each of the other series of said plurality of derived pulses is position modulated relative to the preceding series of derived pulses in accordance with a respective one of said plurality of variable voltages; means for transmitting and means for receiving said series of reference pulses and said plurality of series of derived pulses; and means responsive to said received series of reference pulses and each of said plurality of received series of derived pulses for producing a like plurality of voltages varying respectively in accordance with each of said first plurality of variable voltages.

7. A communication system comprising a source of a series of reference pulses; a source of intelligence signals; means for transmitting said reference pulses and means for transmitting said intelligence signals for a given time interval after each reference pulse; means for delaying each pulse of said series of reference pulses for said given time interval; a plurality of sources of variable voltages; means responsive to said plurality of variable voltages for deriving a like plurality of series of pulses from said series of delayed reference pulses, wherein a first of said plurality of series of derived pulses is position modulated relative to said series of delayed reference pulses in accordance with a first of said plurality of variable voltages, a second of said plurality of series of derived pulses is position modulated relative to said first series of derived pulses in accordance with a second of said plurality of variable voltages, and in a like manner each of the other series of said plurality of derived pulses is position modulated relative to the preceding series of derived pulses in accordance with a respective one of said plurality of variable voltages; means for transmitting said plurality of series of derived pulses; means for receiving said series of reference pulses, said intelligence signals, and said plurality of series of derived pulses; means for reproducing said received intelligence signals for said given time interval; means for delaying each of said received series of reference pulses for said given time interval; and means responsive to said received series of delayed reference pulses and to each of said plurality of received series of derived pulses for producing a like plurality of voltages varying respectively in accordance with each of said first-mentioned plurality of variable voltages.

STANLEY N. VAN VOORHIS.

REFERENCES CITED

The following references are of record in the file of this patent:

UNITED STATES PATENTS

| Number | Name | Date |
|---|---|---|
| 2,267,827 | Hubbard | Dec. 30, 1941 |
| 2,321,971 | Becker | June 15, 1943 |
| 2,371,415 | Tolson | Mar. 13, 1945 |
| 2,377,902 | Relson | June 12, 1945 |
| 2,389,692 | Scherwin | Nov. 27, 1945 |
| 2,426,654 | White | Sept. 2, 1947 |
| 2,472,535 | Jones | June 7, 1949 |